United States Patent [19]

Kotaka et al.

[11] Patent Number: 5,554,204

[45] Date of Patent: Sep. 10, 1996

[54] SURFACE TREATMENT METHOD FOR QUARTZ MATERIAL

[75] Inventors: Hiroaki Kotaka, Nagoya; Nobuhisa Kurono, Chita-gun; Hidenori Yamaoka, Nagoya; Yoshirou Aiba, Zama; Shuuitsu Matsuo, Atsugi, all of Japan

[73] Assignee: Toshiba Ceramics Co., Ltd., Tokyo, Japan

[21] Appl. No.: 281,107

[22] Filed: Jul. 28, 1994

[30] Foreign Application Priority Data

Aug. 9, 1993 [JP] Japan .................................. 5-217086

[51] Int. Cl.⁶ ........................................................ C03C 3/06
[52] U.S. Cl. ........................ 65/60.8; 65/60.1; 427/248.1; 427/255; 427/255.1; 427/255.2; 427/255.7
[58] Field of Search .......................... 427/248.1, 255, 427/255.1, 255.2, 255.7; 65/60.1, 60.8

[56] References Cited

U.S. PATENT DOCUMENTS

| | | |
|---|---|---|
| 3,746,569 | 7/1973 | Pammer et al. ........................ 427/237 |
| 4,565,711 | 1/1986 | Pinkhasov ............................ 427/255.1 |
| 4,741,925 | 3/1988 | Chaudhuri et al. ................... 427/255.2 |
| 5,234,606 | 8/1993 | Kashida et al. ......................... 427/255 |

*Primary Examiner*—Archene Turner
*Attorney, Agent, or Firm*—Foley & Lardner

[57] ABSTRACT

Quartz material is subjected to a heat contact treatment with ammonia gas at 1200° C. less under the presence of a carbon generating source to form a silicon oxynitride layer on the surface of the quartz material easily and rapidly. The obtained surface-treated quartz material has excellent heat resistance, and no exfoliation of the silicon oxynitride layer from the quartz material occurs even when it is subjected to a repetitive heat cycle. Further, if a second surface treatment step of coating a silicon nitride film on the silicon oxynitride layer using a CVD method or the like is performed after the surface treatment step of forming the silicon oxynitride layer on the surface of the quartz material, the heat resistance is more improved.

7 Claims, 4 Drawing Sheets

SURFACE TREATMENT METHOD FOR QUARTZ MATERIAL

BACKGROUND OF THE INVENTION

1. Field of the Invention

This invention relates to a surface treatment method for quartz material to improve heat resistance of quartz material such as quartz glass and prevent diffusion of impurities into the quartz material.

2. Description of Related Art

Generally, quartz material represented by quartz glass, can be easily purified in high concentration and have a high heat resistance, and thus this material has been widely used for various kinds of jigs and structural material for producing semiconductors. In addition, semiconductors have been recently promoted to be integrated, and the promotion of the integration causes diffusion of impurities contained in quartz glass, etc. not to be negligible. Therefore, still higher purity has been required for the quartz material.

On the other hand, it is general that the heat-resisting temperature of quartz glass or the like decreases as its purity increases. Therefore, when it is used as a jig or an element for the semiconductor manufacturing, not only the purity is required to be improved, but also the heat resistance is required to be remarkably promoted.

To improve the heat resistance and prevent the diffusion of impurities for high-purity quartz glass, etc., there has been conventionally proposed a method in which the surface of quartz glass or the like is nitrided, or a method in which a heat-resisting layer such as boron nitride (BN), aluminum nitride (AlN), silicon nitride ($Si_3N_4$) or the like is formed. For example, as proposed in Japanese Laid-open Patent Application Nos. 60-246281 and 4-59633, quartz material is disposed in an ammonia atmosphere to nitride the surface of the quartz material. Further, as proposed in Japanese Laid-open Patent Application No. 59-227800, a surface treatment technique such as a plasma CVD method or the like is used to form a BN or AlN coating layer on the surface of the quartz material. Still further, Japanese Laid-open Patent Application No. 62-96349 proposes a quartz glass reaction tube for a semiconductor heat treatment, on the outer surface of which a minute silicon nitride layer is formed by a CVD method of flowing silicon tetrachloride ($SiCl_4$) and ammonia gas ($NH_3$) at a high temperature of 1200° C. under a vacuum condition.

However, the conventional methods as described above have the following disadvantages.

In the first method of nitriding the surface of the quartz material with ammonia as disclosed in Japanese Laid-open Patent Application No. 60-246281, a nitriding rate at a temperature below 1200° C. is low, and substantially no nitriding process progresses in this temperature range. Accordingly, in this method the quartz material is required to be subjected to the nitriding treatment at a higher temperature of 1200° C. for example. However, in the high temperature range above 1200° C., the quartz material is liable to be thermally deformed.

In the second method as disclosed in Japanese Laid-open Patent Application No. 4-59633, porous silica is nitrided with ammonia at a temperature below 1000° C. However, this method is applicable to only soot-like fine particles of silica, and thus it is impossible that after molding the silica fine particles into an article such as a semiconductor manufacturing jig, the nitriding treatment using ammonia at 1000° C. or less is conducted on the article.

On the other hand, in the third method of forming the BN or AlN coating layer of high heat resistance on the surface of the quartz material serving as a base member, when the quartz material and the coating layer are subjected to a heat cycle which is usually used in a semiconductor manufacturing process and repetitively conducted in a broad temperature range from a room temperature to 1000° C. or more, there is a possibility that the coating layer exfoliates from the quartz material because there is a large difference in thermal expansion coefficients between the quartz material and the heat-resisting coating layer. In order to prevent the exfoliation of the coating layer from the qartz material, an intermediate layer of $Si_3N_4$, a silicon carbide (SiC) or AlN is formed between the quartz material (quartz glass or the like) and the BN or AlN coating layer as disclosed in Japanese Laid-open Patent Application No. 59-227800. The material used for the intermediate layer has a thermal expansion coefficient which locates between the thermal expansion coefficients of the BN or AlN coating layer and the quartz glass, however, the difference in thermal expansion coefficients between the quartz material and the intermediate layer is still large, so that the exfoliation problem cannot be perfectly solved.

Still further, in the method as disclosed in Japanese Laid-open Patent Application No. 62-96349, the surface treatment is required to be conducted above 1200° C. and thus the thermal deformation may occur in the treatment process. In addition, with respect to the minute silicon nitride layer formed on the outer surface, the exfoliation problem based on the difference in thermal expansion coefficients between the quartz and the silicon nitride layer also occurs.

SUMMARY OF THE INVENTION

This invention has been implemented in view of the foregoing conventional problems, and has an object to provide a surface treatment method for quartz material in which a surface treatment can be easily and rapidly conducted on quartz material at a relatively low temperature with improving the heat resistance of the obtained quartz material, and no exfoliation of a surface layer from the quartz material occurs in a heat cycle over a broad temperature range.

In order to attain the above object, the inventors of this invention have further reconsidered the conventional surface treatment method for quartz materials with ammonia gas as described above.

It is generally known that the nitriding reaction of quartz material ($SiO_2$) such as quartz glass, etc. under an ammonia-gas atmosphere progresses from a temperature of about 200° C., however, the heat treatment must be conducted at a temperature of about 900° C. or more to obtain an industrially usable reaction rate and the heat treatment at a temperature higher than 1200° C. causes the effect of the nitriding treatment to be reduced. Therefore, except for the nitriding process for fine particles of silica in the conventional method as described above, the ammonia nitriding treatment for the quartz material is ordinarily conducted at about 900° C. to 1200° C., and it is industrially most effective to conduct the nitriding treatment for the quartz material with ammonia at about 1200° C. However, as described above, there is a possibility that the quartz material is deformed in a high-temperature range of 1200° C. Further, according to the inventors, it has been found out that silicon oxynitride ($Si_2ON2$) is formed on the surface of quartz in the nitriding treatment for quartz material, however, silicon monoxide (SiO) is more frequently formed at a high temperature exceeding 1200° C., so that the amount of $Si_2ON_2$ is reduced and the nitriding treatment cannot be effectively performed.

Therefore, the inventors have intensively studied the ammonia nitriding treatment for quartz material to find out a method of effectively performing the nitriding treatment for quartz material at a temperature which is as low as possible, resulting in finding out that the reaction is greatly promoted by treating the quartz material with ammonia under the presence of a carbon generating source.

That is, the surface treatment method for quartz material according to this invention is characterized in that quartz material which is a target for the surface treatment is subjected to a heat contact treatment with ammonia gas at a temperature below 1200° C. under the presence of a carbon generating source.

In this invention, hydrocarbon or solid carbon is preferably used as the carbon generating source. When hydrocarbon is used, a mixing rate of the hydrocarbon to ammonia gas is preferably in the range of 1 to 70 vol %.

The quartz material obtained by the surface treatment method according to this invention has a silicon oxynitride layer on the surface thereof, and the amount of nitrogen in the silicon oxynitride is gradually reduced from the surface to the inside of the layer.

Further, according to this invention, the heat contact treatment of the surface of the quartz material as described above can be followed by a second step to form silicon nitride film on it by CVD method, etc. The quartz material thus has a silicon nitride film on the silicon oxynitride layer.

According to the surface treatment method of this invention, the nitriding treatment is easily and rapidly conducted on the quartz material at a temperature lower than about 1100° C. to form the silicon oxynitride layer on the surface of the quartz material, so that improvement of the heat resistance of quartz material articles such as quartz glass, etc. can be promoted without occurrence of deformation due to thermal strain. In addition, there occurs no exfoliation of the silicon oxynitride layer formed on the surface of the quartz material through a repetitive heat cycle in which;the temperature is varied over a broad range. Accordingly, by conducting the surface treatment on various kinds of members of high-purity quartz material or jigs according to the method of this invention, quartz members having excellent heat resistance and little diffusion of impurities, and thus this method is suitably used to manufacture highly-integrated semiconductors.

BRIEF DESCRIPTION OF THE DRAWINGS

FIG. 2 shows an IR spectral diagram of non-treatment quartz glass or the like;

DETAILED DESCRIPTION OF THE INVENTION

Figure 1:
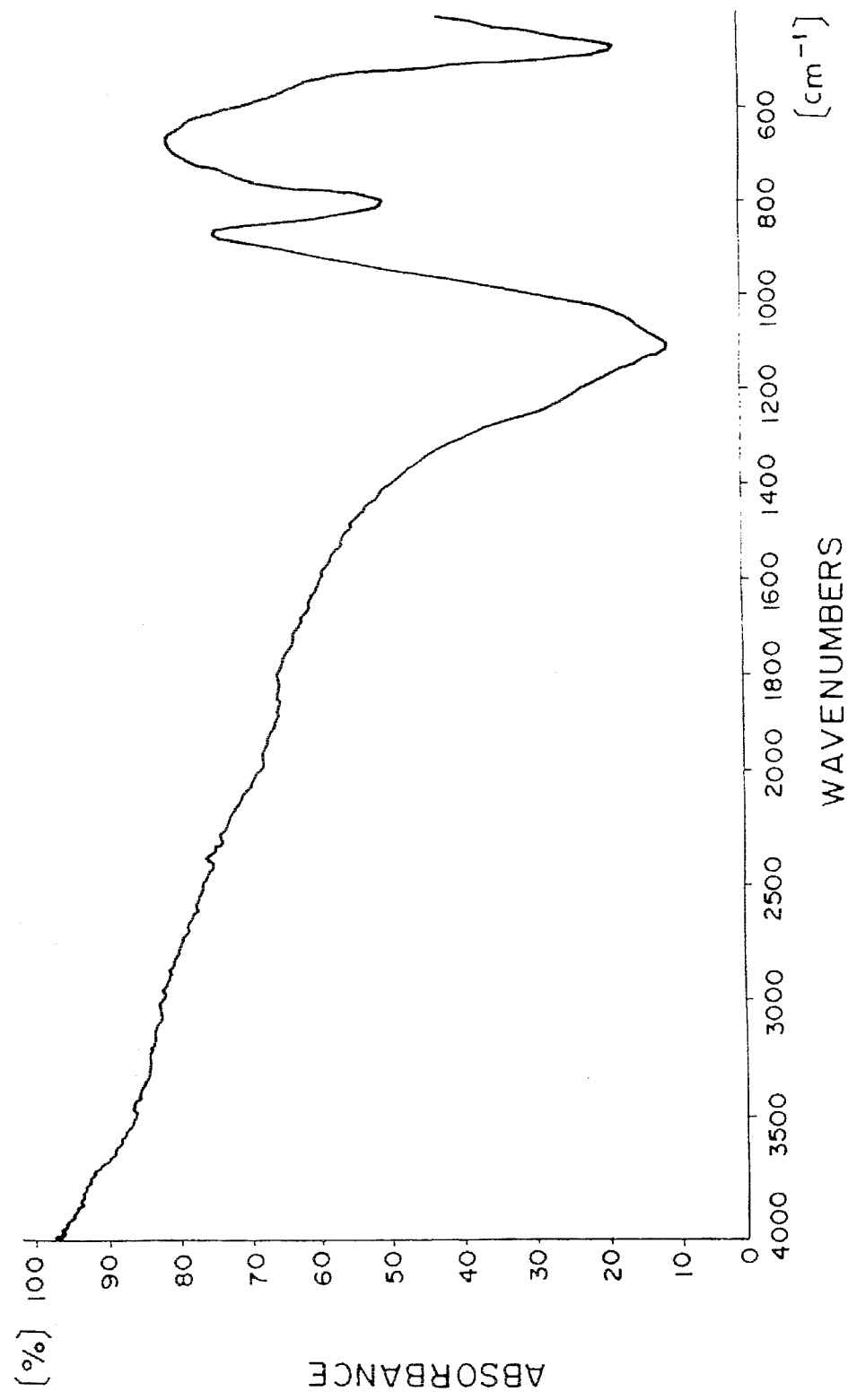
FIG. 1 shows an IR spectral diagram (infrared spectrum) of quartz glass or the like which is subjected to the surface treatment according to an embodiment of this invention.

According to the surface treatment method of this invention, quartz material such as quartz glass or the like is subjected to a heat treatment with ammonia gas under the presence of a carbon generating source such as hydrocarbon gas, solid carbon or the like, so that the surface of the quartz material is nitrided to form a silicon oxynitride layer on the quartz material, and the nitiriding rate of the surface can be remarkably improved.

Through the heat treatment between the quartz material and ammonia gas, the reaction as represented by the following chemical equation occurs, so that the surface of the quartz material becomes a silicon oxynitride layer.

$$2SiO_2+2NH_3 \rightarrow Si_2ON_2+3H_2O \qquad (1)$$

In this invention, the heat treatment is conducted on a reaction system of the equation (1) under the presence of the carbon generating source at a temperature of 1200° C. or less, preferably from 700° to 1100° C., whereby the reaction rate can be remarkably promoted as compared with the conventional method.

That is, in the reaction system according to this invention in which the carbon generating source exists, it is expected that carbons generated from the carbon generating source induces the reaction as represented by the following equation (2) to consume $H_2O$ at the right side of the equation (1) which is generated in the reaction of the quartz material and ammonia of the equation (1), and the partial pressure of $H_2O$ is reduced in the reaction system, so that the reaction from the left side to the right side of the equation (1) is promoted.

$$3H_2O+3C \rightarrow 3H_2+3CO \qquad (2)$$

As a result, even in the relatively low temperature below 1200° C. preferably from 700° to 1100° C., the nitriding treatment or the quartz mater,al with the ammonia gas progresses efficiently, and the heat-resisting surface treatment of the quartz material can be smoothly performed.

As described above, according the heat contact treatment of this invention, the relatively low temperature of 700° to 1100° C. is sufficient as the heat temperature, and thus there is no possibility that the quartz material serving as a target to be treated is deformed due to thermal strain. Further, as compared with the conventional method in which the heat-resistance surface treatment of the quartz material with ammonia at a temperature below 1000° C. is limited to fine particles of quartz material, according to the method of this invention, the quartz material can be treated after molded into semiconductor manufacturing members or jigs, and thus this invention has more excellent industrial working performance.

Hydrocarbon and/or solid carbon is used as the carbon generating source of this invention. No limitation is imposed on the hydrocarbon insofar as it is decomposable at the heat treatment temperature. Ordinarily, hydrocarbon of $C_3$ to $C_4$ is used, and so-called LPG (liquefied petroleum gas) is preferably used. Further, amorphous carbon such as soot, charcoal, carbon black or the like is usually used as the solid carbon.

When hydrocarbon is used as the carbon generating source, the heat contact treatment is preferably performed under a mixture gas atmosphere of ammonia gas and hydrocarbon gas as a reaction-system atmosphere, and the mixture is formed by mixing the hydrocarbon gas into the ammonia gas. The mixture rate of the hydrocarbon gas and the ammonia gas is set so that the hydrocarbon gas is 1 to 7 vol %, preferably 3 to 10 vol %, and more preferably 5 to 7 vol % of the ammonia gas. If the mixture rate is less than 1 vol %, the reaction rate is little promoted. On the other hand, if the mixture rate exceeds 70 vol %, the ammonia gas is consumed by decomposition of the hydrocarbon, and thus the reaction rate is remarkably reduced.

When the solid carbon is used as the hydrocarbon generating source, the solid carbon is subjected to a purification treatment to suppress the total impurity concentration below 10 ppm. Thereafter, quartz glass is embedded into the solid carbon, and heated under an ammonia current. The heat condition is identical to that in a case where LPG is used.

In this invention, the quartz material which is subjected to the surface treatment to improve the heat resistance may be high-purity quartz glass and quartz which are frequently used as a member for semiconductor manufacturing, and various kinds of glass mainly containing $SiO_2$ such as high silicate glass, Vycor glass or the like may be further used.

As described above, the heat contact treatment of this invention is performed at the mixture gas atmosphere of ammonia and hydrocarbon, at the ammonia gas atmosphere under the presence of solid carbon, or at the mixture gas atmosphere of ammonia and hydrocarbon under the presence of solid carbon, however, various kinds of gas such as hydrogen gas, inert gas such as nitrogen gas, etc. may be mixed with one another, if occasion demands.

Further, the heat contact treatment of this invention is performed below 1200 °C., preferably at a temperature of 700° to 1100° C., and a treatment time is suitably determined on the basis of a treatment temperature and other treatment conditions, for example, the kind, shape, volume, etc. of quartz material serving as a target to be treated, a mixture rate of ammonia gas and other gas such as hydrocarbon under a treatment atmosphere, etc. Usually, the treatment time is set to 5 to 50 hours. In general, if the treatment temperature is set to a high temperature, the treatment time can be shortened.

In the quartz material which is subjected to the surface treatment of this invention, the formation of silicon oxynitride is started from the surface of the quartz material, and nitorgen is gradually diffused into the inside of the quartz material. Therefore, there is obtained a nitrogen distribution in which the nitrogen amount is highest on the surface, and is gradually reduced toward the inside of the quartz material. Accordingly, the thermal expansion coefficient of the quartz material is continuously varied from the surface thereof to the inside thereof. Therefore, even when the quartz material is subjected to the heat cycle, there is no possibility that the silicon oxynitride layer formed by the surface treatment exfoliates from the quartz material, and thus it is suitably used as a semiconductor manufacturing member or the like.

In this invention, the quartz material may be subjected to the surface treatment at two steps. In this case, a first step comprises a step of conducting the heat contact treatment on quartz material and ammonia under the presence of the carbon generating source as described above to form a silicon oxynitride layer on the quartz material, and a second step comprises a step of forming a silicon nitride film on the silicon oxynitride layer at the surface of quartz material. The second step is conducted after the first step. The quartz material obtained by the two-step surface treatment has a double (dual) layer structure that the silicon oxynitride layer is formed as an intermediate layer at the surface of the quartz material, and further the silicon nitride film is formed on the surface of the silicon oxynitride layer, and through this surface treatment, not only the surface exfoliation can be prevented, but also the heat resistance can be more improved.

That is, according to the quartz material which is surface-treated at the two steps, the minute silicon nitride film is formed on the outer surface of the quartz material on which the silicon oxynitride layer has been formed, and thus the quartz material has a higher heat resistance.

Since the thermal expansion coefficient of the silicon oxynitride ($Si_2ON_2$) locates between the thermal expansion coefficients of quartz material and silicon nitride, there is no possibility that the silicon oxynitride layer exfoliates from the quartz material through a repetitive heat cycle, and also there is no possibility that the silicon nitride film exfoliates from the quartz material.

In this invention, the silicon nitride film forming process which is the second surface treatment step may be performed by suitably selecting a conventional method such as a CVD method or the like. Further, the silicon nitride film may be amorphous or crystalline. When the silicon nitride film is crystalline, the treatment temperature of the CVD method exceeds 1200° C., and thus quartz glass or the like may suffer thermal deformation. Therefore, it is preferable to form an amorphous silicon nitride film. Still further, in the formation of silicon nitiride film using the CVD method, it may be adopted that the heat temperature in a furnace is set to a temperature less than 1200° C. at an initial step to deposit an amorphous silicon nitride film first, and then the heat temperature is increased to 1200° C. or more to deposit a crystalline silicon nitride film.

As described above, according to the surface treatment method for quartz material of this invention, a surface layer which has excellent heat resistance and is hardly exfoliated from the quartz material even through the repetitive heat cycle can be easily and rapidly formed on the surface of the quartz material.

Preferred embodiments according to this invention will be described in more detail, however, this invention is not limited to the following embodiments.

EXAMPLES

Embodiment 1

Quartz glass was subjected to the heat contact treatment in mixture gas of ammonia gas and LPG (hydrocarbon) gas. The mixture rate of the hydrocarbon gas to the ammonia gas was set to 5 vol %, and the surface treatment was performed at 1000° C. for 48 hours. FIG. 1 shows an IR spectrum of the quartz glass after the surface treatment, and FIG. 2 shows an IR spectrum of quartz glass which was subjected to no surface treatment (comparative example).

Figure 2:
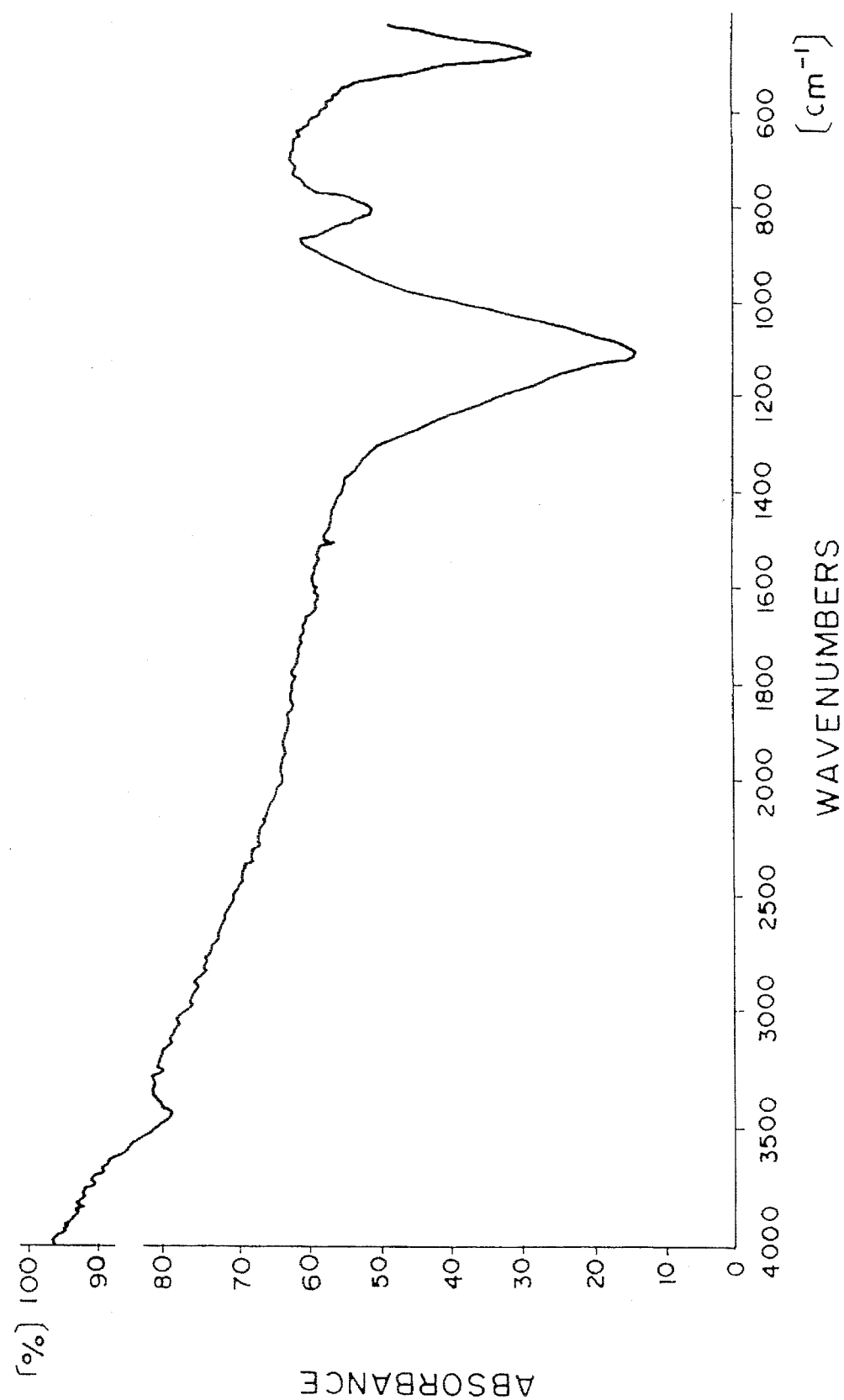

As is apparent from comparison between FIGS. 1 and 2, absorption of Si—O—Si at about 1100 $cm^{-1}$ extends to a low wavenumber side. This extension of the absorption band is caused by the fact that nitrogen is solid—solved in Si—O—Si bonding of $SiO_2$, and it is apparent from this fact that the proper nitriding treatment is performed through the surface treatment using ammonia at 1000° C. under the presence of the carbon generating source of the hydrocarbon gas.

Embodiment 2

Figure 3:
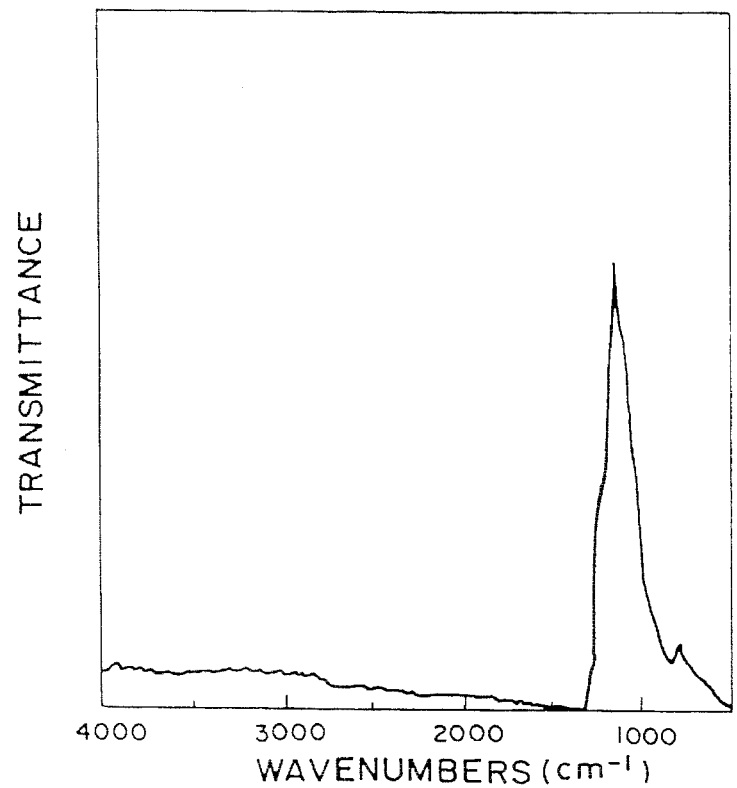
FIG. 3 is an FT-IR spectral diagram (Fourier transform infrared spectrum) of quartz glass or the like which is subjected to the surface treatment of the embodiment according to this invention.
Figure 4:
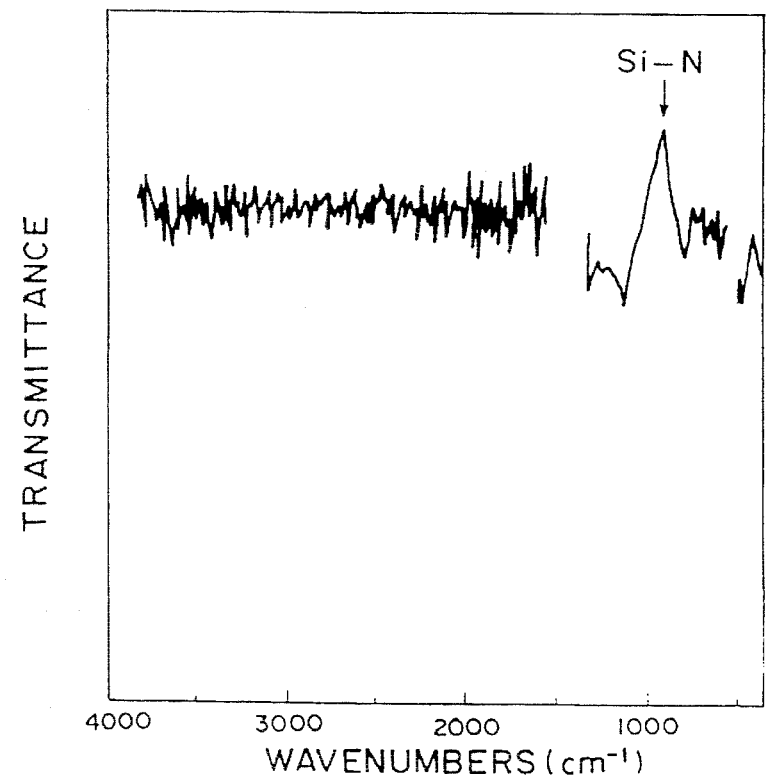
FIG. 4 blank-calibrated spectrum of FIG. 3.

The surface treatment was performed under the same condition as the Embodiment 1, except that the heat treatment temperature was set to 1050° C. after the surface of a quartz glass plate was optically polished, and the treatment time was set to 20 hours. The surface of the surface-treated quartz glass was analyzed by FT-IR (reflection). FIG. 3 shows an analysis spectrum of the surface, and FIG. 4 shows a blank-calibrated spectrum of FIG. 3, which was obtained on the basis of a blank analysis result of FT-IR (reflection) for the surface of quartz glass which was subjected to no surface treatment. As is apparent from FIGS. 3 and 4, Si—N bonding are formed on the surface of the quartz glass by the surface treatment of this invention.

Figure 5:
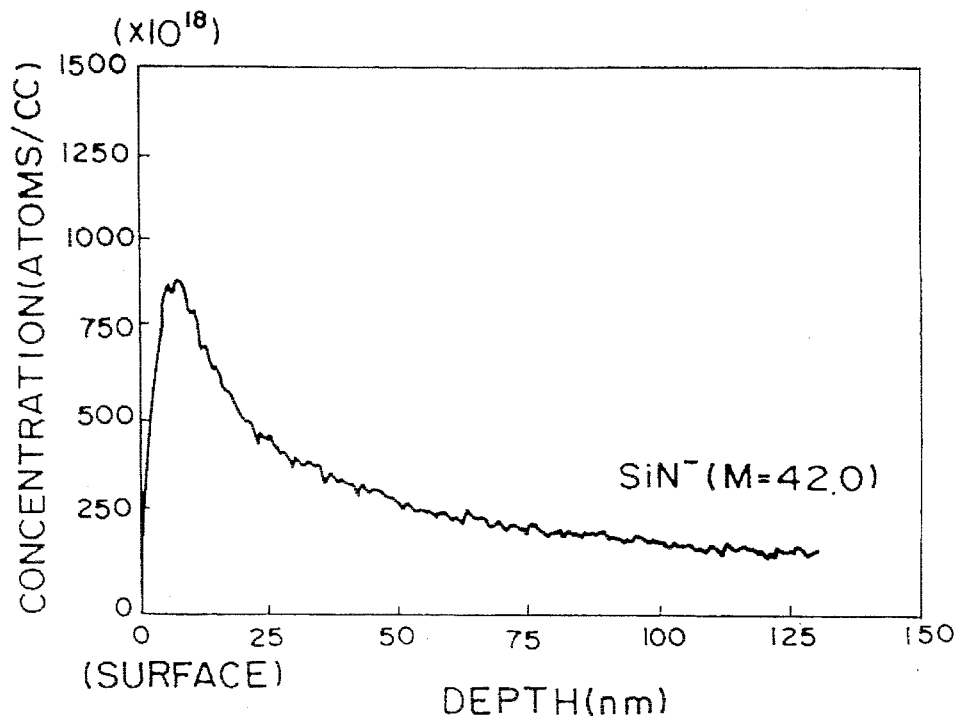
FIG. 5 shows an analysis result of SIMS (secondary ion mass spectroscopy) of the embodiment according to this invention.

The thus surface-treated quartz glass was measured with SIMS, and FIG. 5 shows the SIMS result.

From FIG. 5, it is confirmed that nitrogen exists from the surface of the quartz glass to a position which is about 25 nm in depth, and the surface of the quartz glass is nitrided while the nitrogen amount is gradually reduced toward the insider of the quartz material. The peak nitrogen concentration was about $9 \times 10^{20}$ atoms/cc (about 1.3 atomic %).

Embodiments 3 to 6 and Comparative Examples 1 to 2

Quartz glass members of 2 mm thickness, 5 mm width and 50 mm length were subjected to the surface treatment. The treatment time was set to 24 hours for all the embodiments, and the mixture rate of LPG to ammonia gas was set to 5 vol %. The treatment temperature was set to 700° C. (Embodiment 3), 800° C. (Embodiment 4), 1000° C. (Embodiment 5) and 1100° C. (Embodiment 6), respectively.

Figure 6:
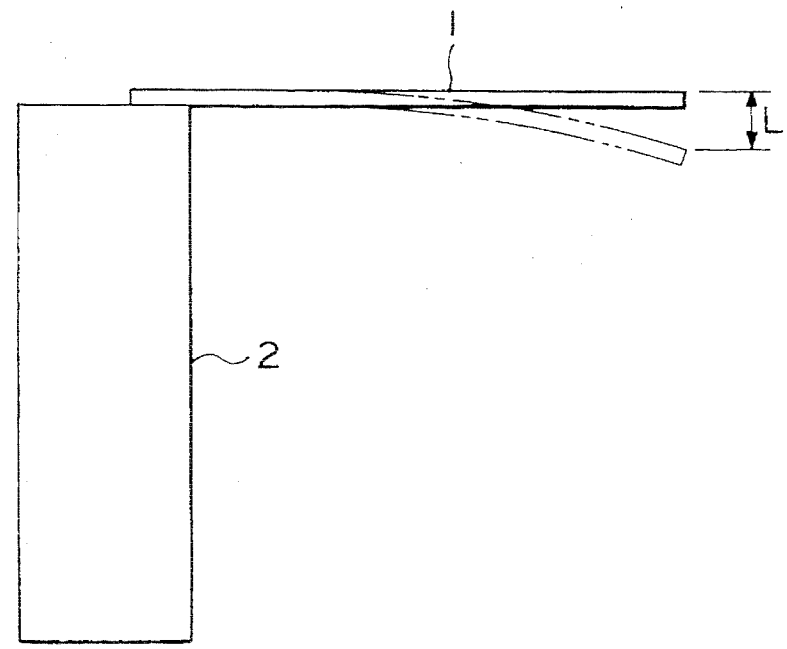
FIG. 6 is a diagram showing a bending test equipment used in the embodiment of this invention and a comparative example.

A thermal deformation amount of each surface-treated quartz glass member was measured using a thermal bending measuring equipment shown in FIG. 6. That is, one end of each quartz glass member 1 is welded to a support stand 2 to form a cantilever, and heated at 1350° C. for one hour. A this time, the bending amount L of the tip portion of the quartz glass member 1 due to heat deformation occurring in the quartz glass member 1 was measured. The measurement result is shown in a table 1.

In addition, for comparison, the bending amount L of a similar quartz glass member which was subjected to no surface treatment was measured in the same manner as the above embodiments (Comparative example 1). The measurement result is shown in the table 1.

A similar quartz glass member was subjected to the heat contact treatment at 1000° C. for 24 hours under the atmosphere of ammonia gas (containing no LPG). The bending amount L of the obtained quartz glass member was measured in the same manner as described above (Comparative example 2). The measurement result is shown in the table 1.

As is apparent from the table 1, as compared with the comparative example 1 on which no surface treatment was conducted, and the comparative example 2 on which the surface treatment was conducted under the atmosphere containing only ammonia gas, the thermal strain is more suppressed and the heat resistance is improved in the quartz glass members which were subjected to the surface treatment under the atmosphere of the mixture gas of ammonia gas and hydrocarbon gas (LPG).

TABLE 1

| | NH$_3$ Surface Treatment Condition | | Si$_3$N$_4$ | Thermal bending |
|---|---|---|---|---|
| | Carbon Source | Temp. (°C.) | Film Formation | Amount (mm) |
| Embodiment | | | | |
| 3 | Yes(LPG) | 700 | No | 8.0 |
| 4 | Yes(LPG) | 800 | No | 7.5 |
| 5 | Yes(LPG) | 1000 | No | 6.4 |
| 6 | Yes(LPG) | 1100 | No | 5.8 |
| 7 | Yes (Solid Carbon) | 1000 | No | 7.0 |
| 8 | Yes(LPG) | 1000 | Yes | 5.8 |
| Comparative Example | | | | |
| 1 | — | — | No | 11.6 |
| 2 | No | 1000 | No | 8.4 |

Embodiment 7

A quartz glass member of 2 mm thickness, 5 mm width and 50 length was embedded into carbon black which had been subjected to a purification treatment, and then heated at 1000° C. for 24 hours under the ammonia current. The thermal bending amount was measured for the obtained quartz glass member in the same manner as the embodiment 5. The measurement result was 7.0 mm.

As is apparent from this embodiment, use of solid carbon improves viscosity of the quartz material more than the comparative example 2 in which the ammonia treatment was made under no presence of a carbon source although the effect of the embodiment 7 is less than the embodiment 5 using LPG.

Embodiment 8

The same quartz glass member as the embodiment 5 was treated in the same manner. Thereafter, the obtained quartz glass member was heated at 1100° C. while supplying each of SiCl$_4$ gas and NH$_3$ gas onto the quartz glass member at a supply rate of 220 cc/min using H$_2$ gas of 2 l/min as carrier gas, thereby forming silicon nitride film on the quartz glass member heat-treated. The vacuum degree in a furnace was set to 5.0 Torr.

The thermal bending amount L of each surface-treated quartz glass member was measured in the same manner. The result is shown in the table 1.

As is apparent from the table 1, when a silicon nitride film is formed on a quartz glass member whose surface is nitrided (a silicon oxynitride layer is formed on the surface of the quartz glass member by the surface treatment of the first step), the thermal deformation can be suppressed, and the heat resistance can be further improved.

Embodiment 9 and Comparative Example 3

A heat-resistance testing was made for each of the quartz glass member which was subjected to the surface treatment of the second step in the embodiment 7 and the quartz glaas member of the comparative example 1 which was not subjected to the nitriding treatment of the first step, but was directly coated with a silicon nitride film in the same manner as the embodiment 7.

The heat-resistance testing was made as follows. That is, each quartz glass member was set in a furnace, and the following heat cycle was repeated: the heat temperature was varied from a room temperature to 1300° C. at a temperature increasing rate of 20° C. /min, then each quartz glass member was naturally cooled to a room temperature, and then the temperature was increased again.

As a result, no exfoliation occurred in the quartz glass member which had been subjected to the two-step surface treatment of the first and second steps even when the heat cycle was repeated ten times or more (Embodiment 7). On the other hand, in the quartz glass member which was coated with the silicon nitride film without being subjected to the surface treatment of the first step, the silicon nitride film on the surface of the quartz glass member exfoliated when the heat cycle was repeated four times (Comparative example 3).

It is also apparent from this result that the heat resistance can be remarkably improved in the quartz material which is surface-treated so that the silicon oxynitride layer is formed on the surface of the quartz material and then the silicon nitride film is further coated on the silicon oxynitride layer.

What is claimed is:

1. A surface treatment method for quartz material, comprising a step of conducting a heat contact treatment on quartz material serving as a target to be treated with ammonia gas at a temperature of 1200° C. or less under the presence of a carbon generating source.

2. The surface treatment method as claimed in claim 1, wherein said heat treatment is made in a temperature range of 700° to 1100° C.

3. The surface treatment method as claimed in claim 1, wherein said carbon generating source is hydrocarbon, and said heat contact treatment is made under mixture gas of ammonia gas and hydrocarbon.

4. The surface treatment method as claimed in claim 3, wherein a mixture rate of the hydrocarbon to the ammonia gas is set to 1 to 70 vol %.

5. The surface treatment method as claimed in claim 3, wherein the hydrocarbon is liquefied petroleum gas.

6. The surface treatment method as claimed in claim 1, wherein said carbon generating source is solid carbon.

7. The surface treatment method as claimed in claim 1, further comprising another step of forming a silicon nitride film, subsequently to said step.

* * * * *